United States Patent
Hebert et al.

(10) Patent No.: US 6,526,050 B1
(45) Date of Patent: *Feb. 25, 2003

(54) PROGRAMMING CALL-PROCESSING APPLICATION IN A SWITCHING SYSTEM

(75) Inventors: Mark P. Hebert, Kingston, MA (US); Michael Silva, South Dartmouth, MA (US)

(73) Assignee: Excel Switching Co., Hyannis, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,555

(22) Filed: Jun. 8, 1998

(51) Int. Cl.[7] ............................................. H04L 12/28
(52) U.S. Cl. ..................... 370/389; 370/463; 370/469; 379/207; 379/242
(58) Field of Search .................. 370/260, 469, 370/389, 392, 396, 408, 463; 379/242, 207

(56) References Cited

U.S. PATENT DOCUMENTS

| | | | | |
|---|---|---|---|---|
| 5,390,241 A | * | 2/1995 | Bales | 379/207 |
| 5,426,694 A | | 6/1995 | Hebert | 379/242 |
| 5,539,884 A | * | 7/1996 | Robrock | 395/200.12 |
| 5,544,163 A | * | 8/1996 | Madonna | 370/60.1 |
| 5,546,453 A | * | 8/1996 | Hebert | 379/242 |
| 6,058,181 A | * | 5/2000 | Hebert | 379/242 |

FOREIGN PATENT DOCUMENTS

| | | | |
|---|---|---|---|
| WO | WO9720439 | 6/1997 | H04Q/3/62 |
| WO | WO9738536 | 10/1997 | H04Q/3/00 |

* cited by examiner

*Primary Examiner*—Alpus H. Hsu
*Assistant Examiner*—Roberta Stevens
(74) *Attorney, Agent, or Firm*—Cesari & McKenna, LLP (57) ABSTRACT

The L4 application in the switch is expanded to permit functions previously performed exclusively in the L5 protocol application. Moreover, the L4 application is programmable by the system operator so that the system operator may expand the predefined set of L4 call management operations to accommodate his call processing requirements. Overall supervision of the call-management operations was previously limited to the L5 applications. However, the ability to program the L4 application enables the system operator to decide which call processing operations will be managed by the L5 applications and which operations will be managed by the L4 application. The system operator may thus define, in the L4 application, a proprietary call model that instructs the switching node to manage all incoming calls, or the system operator may specify the call model on a channel by channel basis. The latter arrangement programs the switching node to use different call-processing protocols among the various channels. In addition, the user may either re-define or define entirely new application programming interface (API) calls for communications between the host and switching node and/or between the switching node and ports.

20 Claims, 5 Drawing Sheets

PROGRAMMING CALL-PROCESSING APPLICATION IN A SWITCHING SYSTEM

TECHNICAL FIELD

The invention relates generally to the field of telecommunications switching systems and more particularly to a software application in a switch that determines how to process calls entering the switch.

BACKGROUND OF THE INVENTION

An example of a switching system to which the present invention applies is described in U.S. Pat. No. 5,544,163, Expandable Telecommunications System, the contents of which are incorporated by reference herein. A telecommunication switching node described therein has line cards with multiple ports connected to subscriber's telephone lines or to other devices such as PSTN trunks. The switching node also includes a switch/matrix card and at least two system buses for switching calls received on one port to another port in the system. One of these buses is an incoming bus that passes messages from the line cards to the matrix card and the other is an outgoing bus which transmits messages from the matrix card to the line cards. In order to perform switching on calls, the switching node receives information from and transmits information to line card ports over the system buses at predetermined times known as time slots. Each time slot generally corresponds with a port on the switch. The time slots assigned to each port and the software applications that manage calls on those time slots are generally termed a "channel."

Overall control of the system is exercised by the host, i.e., a group of software applications that typically reside on a computer. The switching nodes are interconnected by an internodal switching network. A second network termed the "host network," interconnects the switching nodes and the host computer for supervisory control. Examples of the host supervisory applications include call setup and tear down applications and applications that incorporate ancillary services such as call forwarding and call waiting.

The host, the switching nodes and the line cards include their own software protocol applications which instruct them on how to handle calls. A Layer 5 (L5) protocol application in the host manages calls at the system level; Layer 3 (L3) protocol applications in the line cards handle calls at the line card level of the system and a Layer 4 protocol application (L4) i.e. a Central Call Processing(CPP) application in the switch, manages calls at the switch level. The layer 4 call-management functions include call connection and reconnection, call parking, call releasing, initiating recorded announcements, call progress tone transmissions and interactive digit collection for interactive voice response (IVR) applications. Overall supervision of these functions is provided in the host layer 5 application.

The switching node operations are limited to those call-management operations supported within the L4 application and the system operator is restricted to a menu of changes pre-defined in the L4 application. Specifically the L4 software application is hidden from the user and cannot be changed by the user.

Moreover, since the L5 host applications manage the L4 functions, when a switch receives an incoming request for service from a line card, the request must be transmitted from the L4 application to the L5 application. In response to the request, the L5 application instructs the L4 application on how to handle it. For example, in order to allocate a digital signal processor (DSP) resource to a particular call, the L4 application relays a request to the host and, in response, the L5 application instructs the L4 application on a specific connection to a DSP resource for the call. Since the L5 application is involved in directing nearly all real-time call processing on the switch, the message traffic between the switch and the host is high and if the host-to-switch link fails or if the host fails, the switch is basically rendered inoperable.

SUMMARY OF THE INVENTION

In accordance with the present invention, the L4 application in the switch is expanded to permit functions previously performed exclusively in the L5 protocol application. Moreover, the L4 application is programmable by the system operator so that the system operator may expand the pre-defined set of L4 call management operations to accommodate his call processing requirements. Overall supervision of the call-management operations was previously limited to the L5 applications. However, the ability to program the L4 application enables the system operator to decide which call processing operations will be managed by the L5 applications and which operations will be managed by the L4 application. The system operator may thus define, in the L4 application, a customized call model that instructs the switching node to manage all incoming calls, or the system operator may specify the call model on a channel by channel basis. The latter arrangement programs the switching node to use different call-processing protocols among the various channels. In addition, the system operator may either re-define or define entirely new application programming interface (API) calls for communications between the host and switching node and/or between the switching node and ports.

With the foregoing arrangement, the switching node can process calls independently from the host, thereby reducing the message traffic between the switching node and the host and also reducing the node's dependence on the host.

In the preferred embodiment of the invention, the L4 application is separated into software objects or state machines that are separately dedicated to specific tasks for each port in the switching node. The term "channel" thus encompasses the data paths between each port and the switch/matrix and the software objects in the switch/matrix that directly supervise the use of these paths. The primary software objects in the L4 application are a channel state machine (CH), a call management state machine (CM) and a physical connections management state machine (PC). Each channel in the node includes a static instance of these primary objects. The L4 application also includes secondary software objects which include an Interworking state machine, a DSP Manager state machine, a Switch Manager state machine, a Conference Manager state machine and a Distributed Router state machine.

The CH in the L4 application is a programmable protocol language (PPL) object which manages channel state information for its associated channel. Channel state information includes information about the state of each of the other objects in the channel. The CH primary functions include managing the L3 or line card channel interface for call control, managing the L5 or host call processing interface when those functions reside in the host, managing DSP resource requests and processing requests and events to and from the CM.

The L4 CM is a PPL object which manages information about the state of any call in the associated channel. The CM represents the originating channel's view of a call and it manages the propagation of channel events (messages) to and from channels on the same switching node (local channels) and to and from channels on other switching nodes (remote channels). The CM 'filters' incoming events from local and remote channels to make sure that those events are proper for the current call and channel states and it performs the necessary interworking functions on events received from local and remote channels. If there is a problem during a call connection, the CM 'drives' the remote channel into the correct call state during the call re-connection. The CM sends an event to the PC when its call state and a local or remote call is ready for a voice path connection. The PC uses these events to determine whether pulse code modulation (PCM) connections should be made or broken.

The PC is a PPL software object which manages PCM switch connection information for its channel. Before a PCM connection is made, both the originating channel and the local or remote channel must be in a state where a connection is appropriate. The originating and the local or remote CM objects determine when their channels are ready for a PCM connection. The originating CM notifies its PC when it is ready for connection and the local or remote CM, through the originating CM, notifies the originating PC when the local or remote channel is ready for connection. When both of these conditions are met, the connection is made. The PC maintains information on whether a channel has a voice path connection active with another channel.

The Interworking State Machine helps to support internal routing and it gives the user the capability to specify the call model on a channel by channel basis. An instance of the Interworking object is dynamically created as it is needed for each channel. When the CM receives an event from a remote channel, the CM 'calls'the Interworking State Machine, which translates the data and returns the result to the CM for processing.

The DSP Manager state machine allocates DSP resources, routes DSP requests to the appropriate DSPs and reports the results to the CH. The Switch Manager state machine and its data structure also manage simple connect and disconnect requests from the PC for all switching types, including local time slot switching and ring switching.

The Conference Manager State Machine manages conference calls by managing the DSP resources and issuing commands to the DSP resources. The conference manager also manages channel connections to the DSP. The Distributed Router state machine is a PPL object that fields requests to route information based on a number of parameters such as, incoming port, resource group and digit string in the message.

Each of the L4 objects includes an interface with parameter values that may be modified by the user. The system includes display screens which display these values and facilitate changes therein by the system operator.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
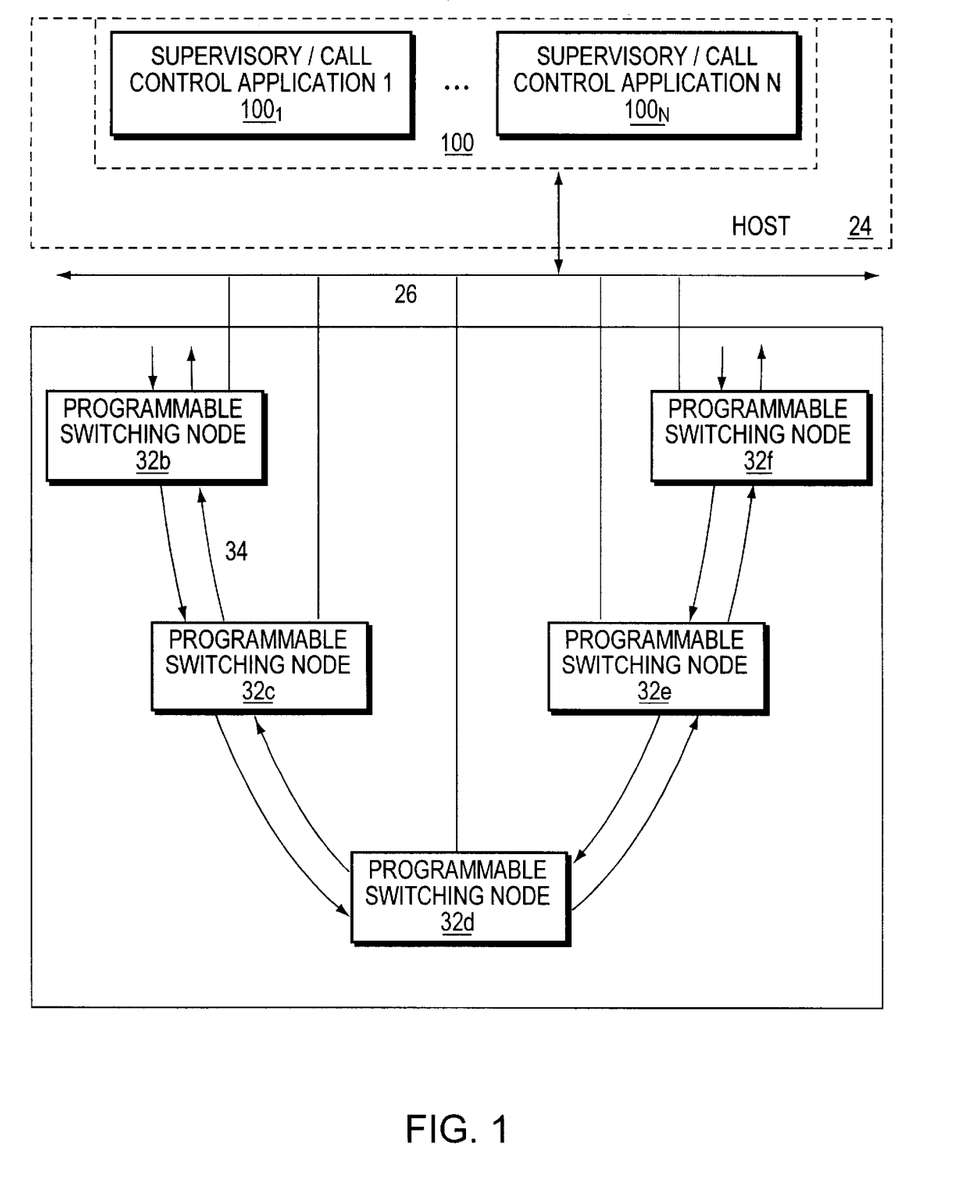
FIG. 1 is a diagram of a call switching system incorporating the invention.

FIG. 1 is a diagram of a communications network that is configured to process calls to, from and within a switching platform in accordance with the present invention. The switching platform includes switching nodes $32b$–$32f$ that are connected by a ring-like internodal switching network 34 to pass among them the various messages handled by the switching platform. Each switching node is associated with a plurality of network/line interfaces (not shown) which provide connections between the switching system and subscribers' lines, for example, and also with other switching systems such as the PSTN. These interfaces also provide access to system resources such as DSP resources and voice mail functions. The communications network also includes a host computer 24 that runs host supervisory applications $100_1$–$100_N$. The supervisory applications $100_1$–$100_N$ provide overall supervision, i.e. control and monitoring, of the switching functions of the network. The host computer 24 is linked to the switching nodes $32b$–$32f$ by a host network 26.

The host computer, the switching nodes and the line cards include their own software protocol applications which handle calls in their respective layers. A Layer 5 application in the host manages calls at the host level, a Layer 4 application in the switching node handles call-management functions in the switching node and Layer 3 applications in the line cards manage calls at the line card level. In the present invention, the Layer 4 application has been expanded to enable the user to define which call processing operations will be managed by the host application and which operations will be managed by the switch. The Layer 4 protocol application includes independent software objects that are dedicated to specific tasks for each channel.

Figure 2:
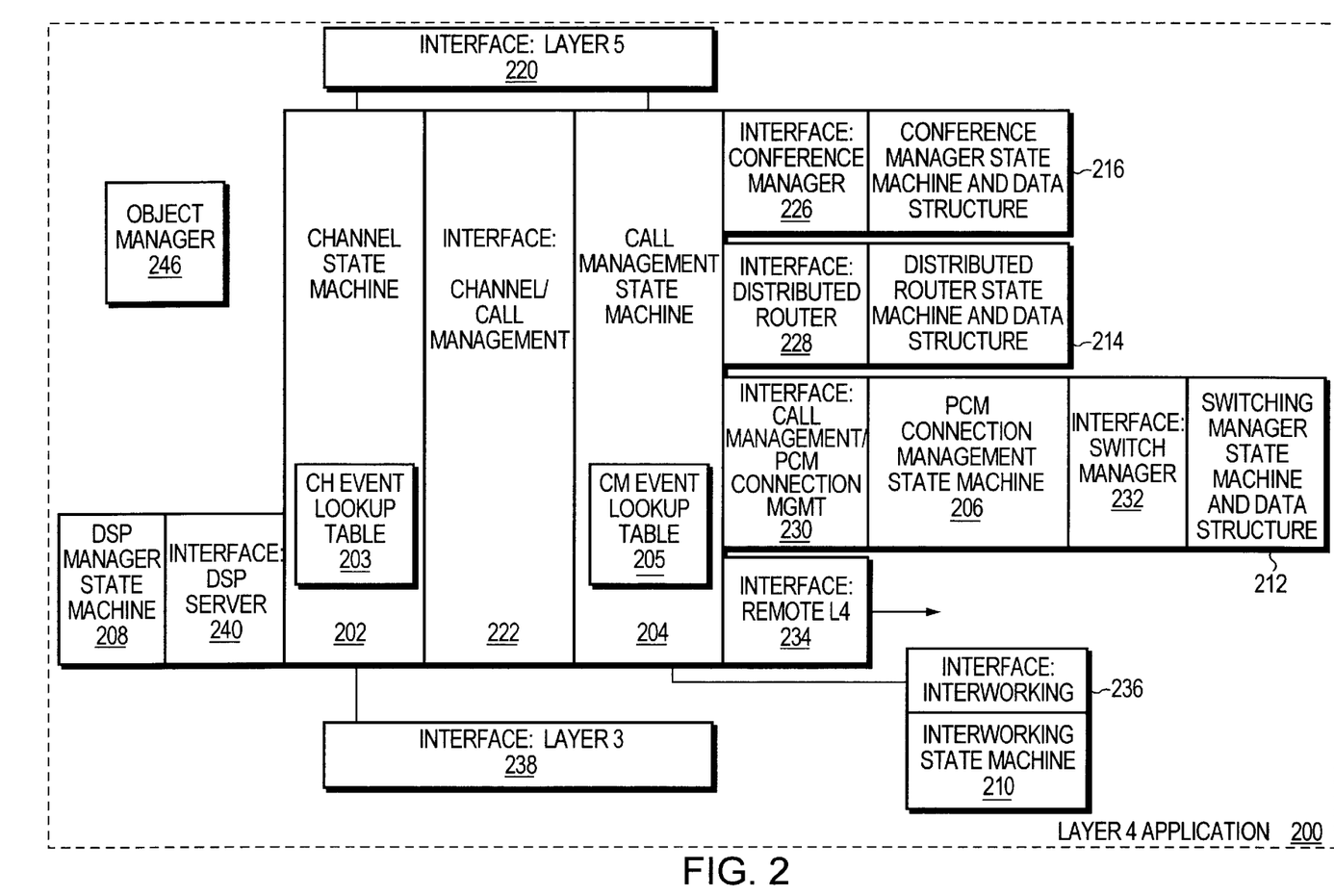
FIG. 2 is a schematic diagram of the Layer 4 protocol application and how the objects interact with each other and with the Layer 5 protocol application and the Layer 3 protocol application.

The illustrative Layer 4 protocol application 200 shown in FIG. 2 includes software objects which function as state machines. The L4 application comprises a channel state machine (CH) 202, a call management state machine (CM) 204, a physical connection management state machine (PC) 206, a DSP manager 208, an interworking state machine 210, a switching manager state machine 212, a distributed router state machine 214 and a conference manager state machine 216. It include an object manager 246 which manages the L4 objects and it also includes a layer 5 interface 220, a channel/call management interface (CH/CM) 222, a conference manager interface 226, a distributed router interface 228, a call management/physical connection management interface (CM/PC) 203, a switch manager interface 232, a remote L4 interface 234, an interworking interface 236, a layer 3 interface 238 and a DSP server interface 240. A static instance of the CH 202, CM 204 and PC 206 is created for every channel in the node and an instance of the interworking state machine is created dynamically as needed for each channel.

Each CH 202 in the L4 application is associated with a channel in the switching node and it manages channel state information. The CH 202 primary functions include managing an L3 or line/card channel interface 238 for call control; managing an L5 or host call processing interface 220 for those call processing functions that reside in the host; managing DSP resource requests; and processing requests and events (messages) to and from the CM 204. Many events supported by the CH 202 are processed identically in most states in the channel. In order to efficiently support these events, the system maintains a CH lookup table 203 of all of the known events and performs a first-order lookup of each incoming event to determine how the event should be processed. If no match is found, the CH 202 performs a second-order lookup in the table 203 to create a default event handler for that event. The event handler then processes the event. The CH 202 may block incoming events, while it is waiting for a specific event, by setting its next processing state as a blocking state. All incoming events that do not clear the blocking state are queued by the CH 202 until an event which clears the blocking state is received.

Each CM 204 manages call state information for a channel in the switching node. The CM 204 manages the propagation of channel events to and from other channels on the same switching node (local channel) and to and from channels on other switching nodes (remote channels) in the switching platform. The CM 204 'filters' incoming events from local and remote channels to make sure that those events are proper for its current call and channel states. If an error occurs during a call connection, the CM 204 'drives' the remote channel into the correct call state during call re-connection. The CM 204 informs the PC 206 when the its channel state and a local or remote channel is ready for a connection to another channel. The PC 206 uses these events to determine whether PCM connections should be made or broken.

The CM 204 also manages all call processing features related to the call association with other channels in the switching platform and call events. It reports appropriate incoming events such as remote alert, answer and call requests from the remote CM 204 to the associated local CH 202. Many events supported by the CM 204 are processed identically in most states of the channel. In order to efficiently support these events, the system also maintains a CM look-up table 205 of incoming events and performs a first-order is lookup of the incoming event to determine how the event should be processed. If no match is found, the CM 204 performs a second-order lookup in the table 205 to create a default event handler for that event.

The PC 206 manages switch connection information for its channel. Before a connection may be made, both the originating and local or remote channels must be in a state where a connection is appropriate. The originating and local or remote CMs 204 determine when their channels are ready for a PCM connection. The originating CM 204 notifies the its PC when the its channel is ready for connection and the local or remote CM 204, through the originating 204 CM, notifies the originating PC 206 when the local or remote channel is ready for connection. When both of these conditions are met, the connection is made through the switching manager 212. The PC 206 maintains information on whether a channel has a voice path connection active with another channel.

The Interworking State Machine 210 helps to support internal routing. It gives the switching node the capability to act as a stand alone protocol converter by allowing the user to specify the call model on a channel by channel basis. An instance of the Interworking 210 is dynamically created when it is needed for each channel. When the CM 204 receives an event from a remote channel, the CM 204 'calls' the Interworking State Machine 210 which translates data and returns the result to the CM 204 for processing. Alternatively, the translation functions could reside in the CM 204.

The DSP Manager state machine 208 is used to allocate DSP resources. The DSP Manager 208 routes DSP requests to the appropriate DSP and it reports the results to the CH 202. The Switching Manager state machine 212 manages simple connect and disconnect requests from the PC 206 for all switching types including local time slot switching and ring switching. The Conference Manager state machine 216 manages conference calls by managing the DSP resources and issuing commands to the DSP resources. The conference manager 216 also manages channel connections to the DSP.

The Distributed Router state machine 214 fields requests to route messages based on a number of parameters such as, incoming port, resource group and digit string in the message. If each switching node in the system maintains a table of all the destination channels for a given route type, the tables may become "stale" as channels in the route group become busy or are taken out of service on remote nodes. Therefore, in a distributed switching environment, the router state machine 214 performs routing schemes in order to minimize the number of router request collisions and failed attempts across nodes due to stale routing tables.

An example of one of the routing schemes employed by the router state machine uses a routing table which may have a routing group that comprises destination channels on that node and one other node. When the CH 202 needs to connect to an idle channel, the router state machine 214 receives a route request from the CH and queries the channel states on its node to find a suitable local route. If the router 214 determines that a channel on a remote node is needed, the router 214 sends a route request to a router on the remote node. Upon receiving the request, the router 214 on the remote node selects a suitable channel and initiates the routing. If no channel is found on the remote node, a routing failure event is sent back to the requesting router.

In order for the L4 objects to communicate with each other, the L4 application includes various interfaces that connect the objects. The CH/CM interface 222 is the basic communication path between the CH 202 and the CM 204. The CH 202 uses the CH/CM interface 222 to report incoming channel events such as L3 alerting and to report service requests, such as, request to make a call association with a remote channel, to the associated CM 204 in a channel. The CM 204 uses the interface to report appropriate incoming events from a remote CM, such as remote answer or call requests events, and to send events to the CH 202 when a request from the CH 202 is received and/or processed.

The Remote L4 interface 234 manages communications between a channel's CM 204 and another channel's or conference's CM. The local CM 204 accesses the interface to send events and requests to the remote CM and the local CM 204 receives events from the remote CM through the remote L4 interface. A call service route request by a local CM to establish a call connection with another channel is handled by the remote L4 interface and the distributed router 214. The route request contains all of the relevant information such as, local call state and PCM format, the channel requesting the connection and any other parameter values required by the router 214.

The CM/PC 230 interface is used by the CM 204 to communicate changes in connection requests from both local and remote CM objects. The PC 206 uses these events to determine whether PCM connections between the local and remote channels should be made or broken. The DSP services interface 240 is used by the CH 202 to initiate DSP service requests and the interface 240 manages many DSP related services provided by L4. In order to satisfy many DSP requests, the CH 202 provides both blocking and non-blocking versions of the DSP requests. This provides the application developer with greater flexibility in handling error conditions when allocating DSP resources.

The L5 interface 220 manages the communications between the L4 application and the L5 application. The interface maintains a list of outstanding L5 messages. The L3 interface 238 manages communications between L3 applications and the L4 application. The switching manager interface 232 manages communications for connection and disconnection of channels in the switching platform. The interface provides the PC 206 with indirect access to all of the switching facilities such as, the switch/matrix card, in the switching node. The router interface 228 manages access to the distributed call router 214 for internal switching platform call routine. The interface allows the L4 application to query whether routing information is available for an incoming call that it is trying to service. The Conference interface 226 manages associations between the CM 204 and a conference.

The system operator may change the way the applications in the host and the switching nodes function by modifying various parameter values used by the L4 objects. When the system is installed at a customer's site, the objects in the L4 application are set to default values which instruct the switching nodes to process calls entering the nodes through the L5 application in the host. The system also includes display screens which display these values and facilitate changes therein by the system operator. By changing these values, the system operator decides which call processing operations will be managed by the L5 application and which operations will be managed by the L4 application. The display screens also enable system operator to specify a call model on a channel by channel basis or to change the API call between the host and switching nodes and/or between the switching nodes and the ports. When the system operator changes the default values, the new values are stored in tables in files on the system. As each object in a channel is instantiated, the L4 application obtains the new values from the files and thus processes the call accordingly.

When a subscriber/user of the switching system takes his/her phone off hook to make a call, the L3 application sends a request for dial tone to the CH object 202 associated with the port. The CH 202 object forwards the request for DSP resources through the DSP interface 240 to the DSP manager state machine 208. The DSP manager 208 allocates DSP resources for tone generation and digits collections to the port.

Figure 3:
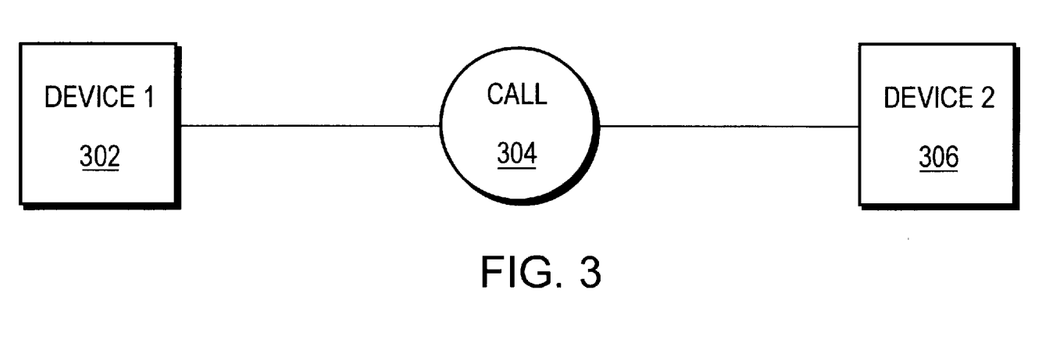
FIG. 3 is a diagram of the switching architecture in the European Computer Manufacturer Association's Computer Supported Telecommunications Applications Phase II specification.

FIG. 3 is an event diagram of the call handling procedure implemented by the various state machines. In the diagram we have followed the architecture in the European Computer Manufacturers Association's (ECMA) Computer Supported Telecommunications Applications (CSTA) Phase II specification. In the CSTA II architecture, a call object 304 and channel or device objects 302 and 306 in each call are separated for distributed call processing systems in which no single centralized call object can exist. In the CSTA II switching model, device objects 302 and 306 and call object 304 together manage each call.

Figure 4:
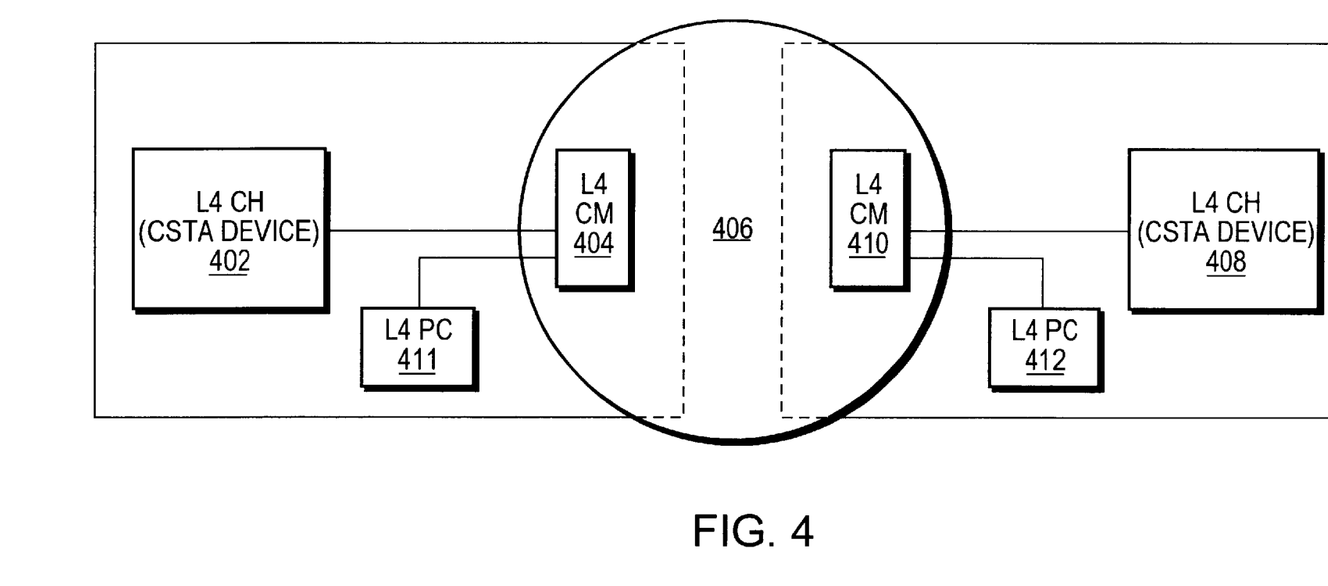
FIG. 4 is an expanded diagram of FIG. 3 that incorporates the invention.

The preferred L4 protocol adopts the CSTA II architecture and separates channel and call objects. As shown in FIG. 4, CH objects 402 and 408 and the CM objects 404 and 410 are the primary software objects in the Layer 4 application and each channel in the switch includes a static instance of these objects. We have implemented the call object 304 of FIG. 3 as the two CM objects 404 and 410 (FIG. 4), each of which is associated with a channel in the call. The call object 406 is connected to two L4 CH objects 402 and 408 and to two L4 PC objects 411 and 412.

Figure 5:
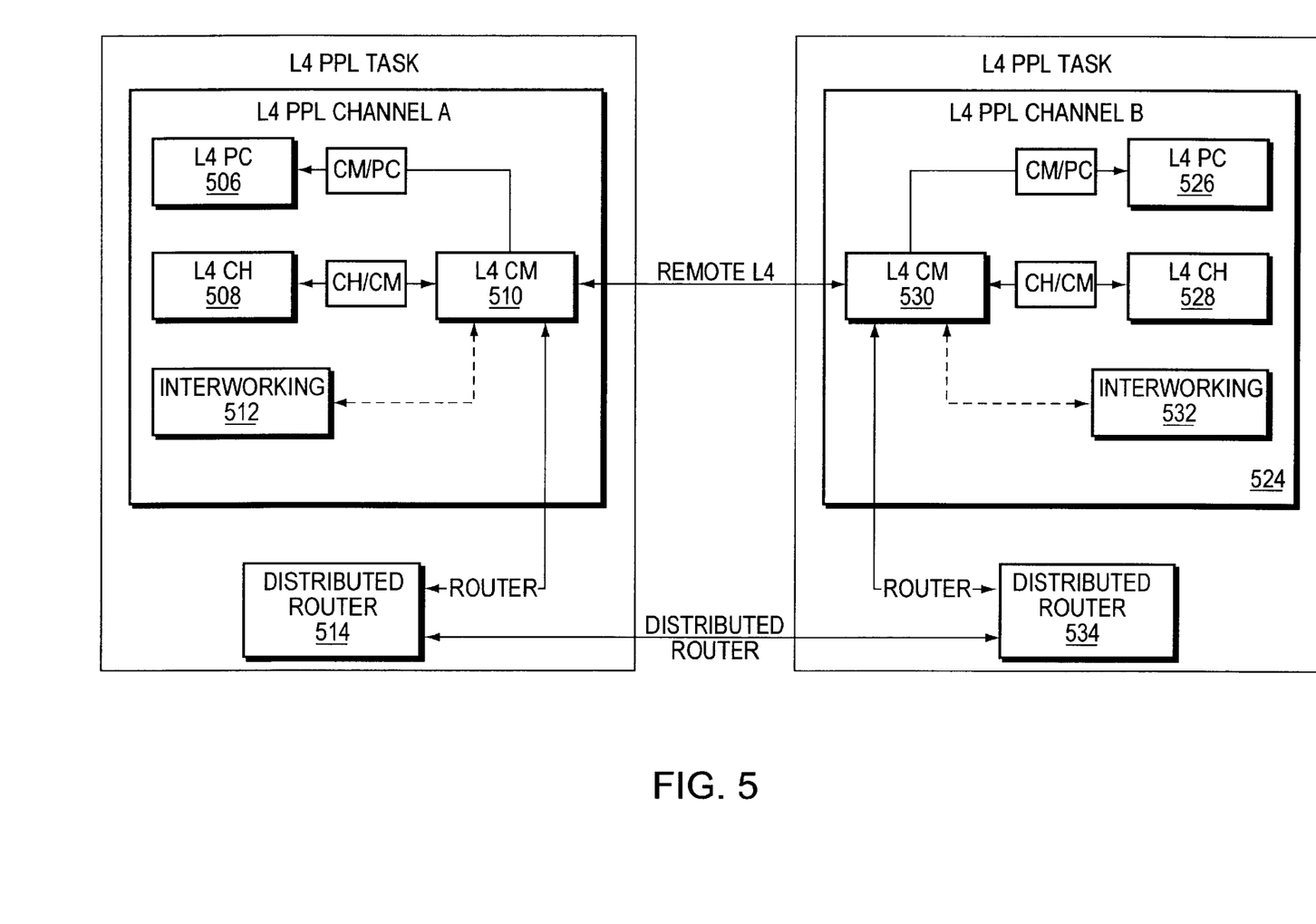
FIG. 5 shows the L4 PPL module interfaces in two channels.

The components in layer 4 have structured internal and external communication interfaces that define which L4 objects communicate with each other and which objects communicate with external resources. FIG. 5 shows the L4 object interfaces in two channels A and B which have been connected to each other. Within channel A, the CH object 508 communicates only with the CM object 510 or the CM object 510 communicate with the CH object 508; the PC object 506, and an interworking module 512, if necessary. Channel B has an identical set of connections among the state machines 526, 528, 530 and 532. All messages between the channels pass through the CM objects 510 and 530. The CM objects 510 and 530 also communicate, if necessary, with their local portions 514 and 534 of the distributed router. The router portions are used by the local CM objects to request routes to other channels and they are also used once a route is determined to invoke call service request events.

Figure 6:
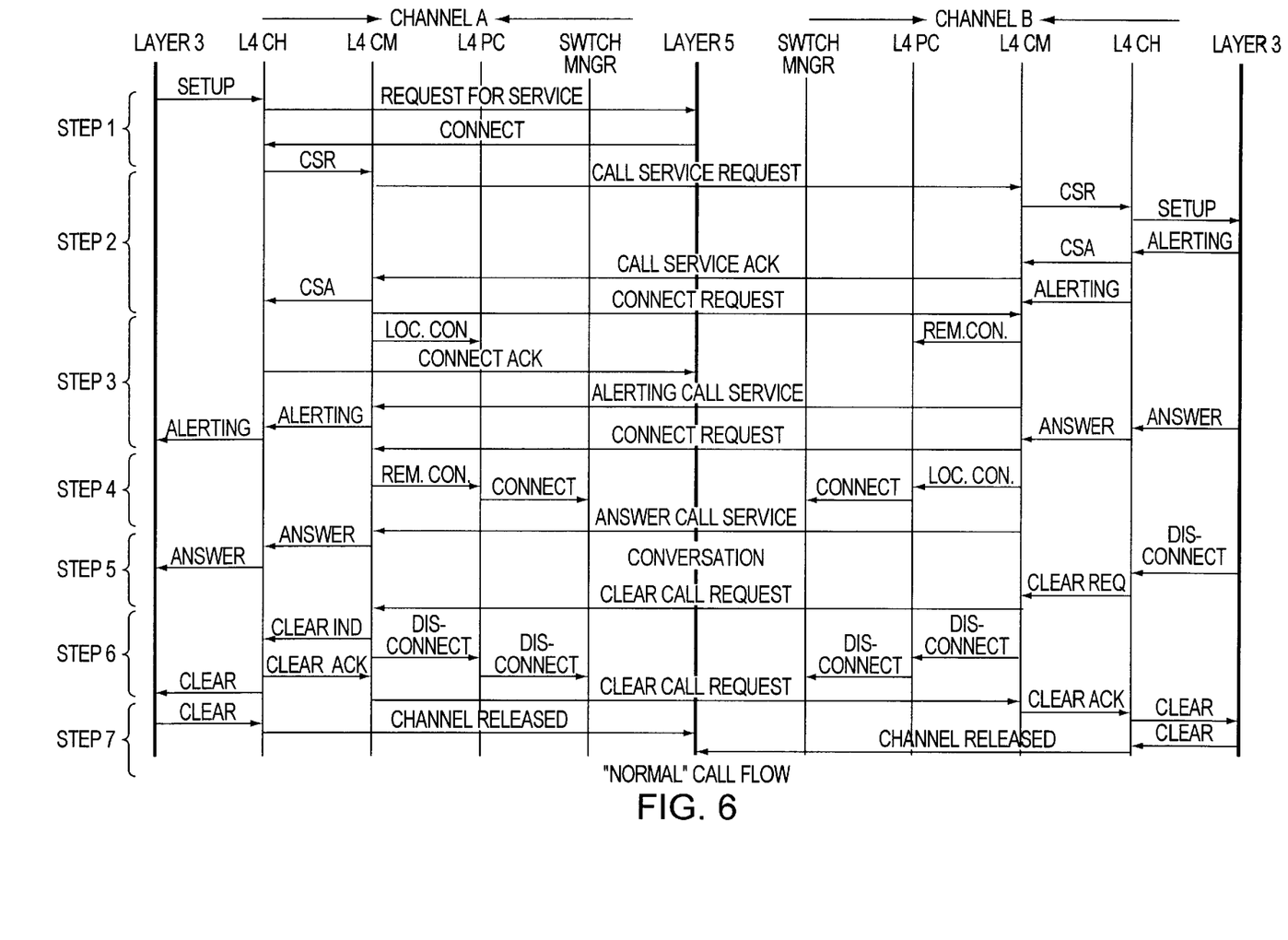
FIG. 6 shows the steps performed by the various protocols in the system during a normal call flow.

FIG. 6 shows the steps performed by the various objects in the system during a "normal" call flow after the customer dials the number. In Step 1, an L3 protocol application sends a call setup request from a line card port to the L4 CH in channel A and the L4 CH then issues a request for service to the L5 application. The L5 application responds with a "connect" message. In step 2, the L4 CH in channel A passes the call service request to the L4 CM in the same channel and based on the parameters in the request, the CM issues the request to the CM in channel B. The CM in channel B relays the call service request to the CH in channel B and the CH in channel B issues a setup request to the L3 application at the destination port. The L3 application alerts the CH in channel B when the setup request is performed and the CH sends a call service acknowledgment to the CM in channel B. The CM in channel B then sends a call service acknowledgment to the CM in channel A. The CM in channel A forwards the acknowledgment to the CH. In Step 3, the CM in channel A issues a connect request to the CM in channel B. The CM in channel B sends a remote connection request to the PC in channel B and the CM in channel A sends a local connection request to the PC in channel A. The CH in channel A issues a connect acknowledgment to the L5 application and the CM in channel B issues an alerting call service message to the CM in channel A. The L3 application sends an answer to the CH in channel B and the CH in channel B sends an answer to the CM. At the same time, the CM in channel A alerts the CH in channel A and the CH in channel A then alerts the L3 application. In step 4, the CM in channel B sends a connect request to the CM in channel A. The CM in channel A sends a remote connection request to the PC in channel A and the CM in channel B sends a local connection request to the PC in channel B. The PC in channel A issues a connect request to the switch manager in channel A and the PC in channel B issues a connect request to the switch manager in channel B.

In step 5, the CM in channel B issues a call service answer to the CM in channel A and the CM in channel A sends to answer to the CH in channel A. The CH in channel A sends the answer to the L3 application and the conversation begins. In Step 6, when the conversation ends, the L3 in application in channel B sends a disconnect message to the CH in channel B. The CH in channel B issues a clear request to the CM in channel B and the CM in channel B issues a clear call request to the CM in channel A. The CM in channel A then issues a clear event to the CH in channel A. The CM objects in channels A and B issue disconnect requests to the PC objects in channels A and B and the PCs in channels A and B issue disconnect requests to the switching managers in channels A and B. In step 7, The CH in channel A sends a clear acknowledgment message to the local CM and the CM in channel sends a clear call request to the CM in channel B. The CM in channel B sends a clear message to the CH in channel B and the CH objects in channels A and B send and receive clear messages from the L3 application. The CH in channel A then sends a channel released message to the L5 application and the CH in channel B sends a channel released message to the L5 application.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A communications network comprising:
   A) a plurality of switching nodes each of which contains line cards with multiple ports for connections between the communications network and subscriber lines or other switching systems;
   B) an internal network interconnecting the switching nodes for conveying switched telecommunications data between them, one of said nodes being a local node and the intended recipient node being a remote node;
   C) a host computer that includes a Layer 5 software application which exercises supervisory control over the nodes;
   D) a host network linking the host computer with the switching nodes;
   E) a programmable Layer 4 software application in each switching node that performs call-processing operations defined by a system operator, the Layer 4 application having separate software objects functioning as state machines with instances of objects being dedicated to specific tasks for one port on the switching node, at least one of said software objects being capable of communicating with Layer 4 objects in a remote node in the telecommunications network, independent of instructions from said host;
   F) channels in each switching node that comprises data paths between ports and a switch/matrix card and software in the switching node that directly supervise the use of these paths;
   G) a plurality of first interfaces adapted to communicate information:
      1. between the software objects in the Layer 4 application,
      2. between the Layer 4 application and the Layer 5 application, and
      3. between the Layer 4 application and a Layer 3 application in the line cards; and
   H) a plurality of second interfaces adapted to communicate information between each port and the Layer 4 application in the same node, independently of the host, and between that Layer 4 application and the Layer 5 application.

2. The communications network of claim 1 wherein the software objects in the Layer 4 application comprise:
   A) a channel object for managing state information for objects for each channel;
   B) a call management object for managing information about the states of calls in each channel and reporting appropriate incoming messages to the channel object;
   C) a physical connection object for managing connection between two channels;
   D) a interworking object for supporting internal call routing in the switching node;
   E) a resource manager object for managing resources on the switching node and reporting the results to the channel object;
   F) a switch manager object for managing connection requests from the physical connection object;
   G) a conference manager object for managing conference calls; and
   H) a distributed router object for routing calls in the switching node.

3. The communications network of claim 2 wherein the Layer 4 application further comprises various interfaces for communications between the software objects and between the Layer 5 application, the Layer 3 application and the software objects; said interfaces including:
   A) a Layer 5 interface for communications between the instances of the software objects and the Layer 5 application;
   B) a channel-call management interface for communications between the channel object and the call management object;
   C) a conference manager interface for communications between instances of the conference manager object and instances of other software objects;
   D) a distributed router interface for communications between the distributed router object and instances of other software objects;
   E) a call management-physical connection interface for communications between the call management object and the physical connection object;
   F) a switch manager interface for communications between the switch manager object and instances of other software objects;
   G) a remote Layer 4 interface for communications between instances of the call management object in two channels;
   H) an interworking interface;
   I) a Layer 3 interface for communications between instances of the software objects and the Layer 3 application; and
   J) a resource object interface for communications between the resource object and instances of other software objects.

4. The communications network of claim 3 wherein a static instance of the channel object, the call management object and the physical connection object is created for every channel in the switching node.

5. The communications network of claim 4 wherein a dynamic instance of the interworking object is created when needed for every channel in the switching node.

6. The communications network of claim 5 wherein the each instance of the channel object manages
   A. an Layer 3 application interface for exchanging messages between the switching node and the line card;
   B. an Layer 5 application interface for exchanging messages between the switching node and the host computer;

C. resource requests for calls processed in the switching node; and

D. processing requests and messages to the call management object.

7. The communications network of claim 6 wherein each switching node maintains tables for processing messages to the channel object and the call management object, the channel object and the call management object processes each incoming message by looking up the message in the table or by creating a default event handler for processing messages not included in the table.

8. The communications network of claim 7 wherein each instance of the call management object
   A. manages the propagation of messages to and from local channels on the same switching node and remote channels on other switching node;
   B. filters messages from local and remote channels; and
   C. sends a message to an instance of the physical connection object when the channel is ready for a connection to another channel.

9. The communications network of claim 8 wherein each instance of the physical connection management object manages connection information for the channel when it is ready for connection to a local or remote channel.

10. The communications network of claim 9 wherein each instance of the interworking object translates messages from remote channels for an instance of the call management object in the same channel, the interworking object instance also enabling the system operator to specify a call model for each call on a channel by channel basis.

11. A switching node (32b) including line cards with multiple ports for connections between the switching node and subscriber lines or other switching systems, the switching node comprising:
   A) a programmable Layer 4 software application (200) that performs call-processing operations defined by a system operator, the Layer 4 application having separate software objects functioning as state machines with instances of the software objects each being separately dedicated to a specific task for a single port on the switching node, such that the switching node can process calls substantially independently of a host, including:
      1. a channel state machine (CH) (202) having a channel object adapted to manage state information for objects for each channel;
      2. a call management state machine (CM) (204) having a call management object adapted to manage information about the state of calls in each channel and reporting appropriate incoming messages to the channel object, said call management object being capable of communicating with a call management object in a remote node independently of said host; and
      3. a physical connections management state machine (PC) (206) having a physical connection object adapted to manage connections between two channels;
   B) channels that comprises data paths between ports and a switch/matrix card and software in the switching node that directly supervise the use of these paths;
   C) connections to a host (24) network for linking the switching node to a host computer that includes a Layer 5 software application which exercises supervisory control over the nodes;
   D) a plurality of first interfaces (220) adapted to communicate information:
      1. between the software objects in the Layer 4 application (200),
      2. between the Layer 4 application and the Layer 5 application, and
      3. between the Layer 4 application and a Layer 3 application in the line cards; and
   E) a plurality of second interfaces adapted to communicate information between each port and the Layer 4 application in the same node, independently of said host and between that Layer 4 application and the Layer 5 application.

12. The switching node of claim 11 wherein the software objects in the Layer 4 application comprise:
   A) a channel object for managing state information for objects for each channel;
   B) a call management object for managing information about the stated of calls in each channel and reporting appropriate incoming messages to the channel object;
   C) a physical connection object for managing connection between two channels;
   D) a interworking object for supporting internal call routing in the switching node;
   E) a resource manager object for managing resources on the switching node and reporting the results to the channel object;
   F) a switch manager object for managing connection requests from the physical connection object;
   G) a conference manager object for managing conference calls; and
   H) a distributed router object for routing calls in the switching node.

13. The switching node of claim 12 wherein the Layer 4 application further comprises various interfaces for communications between the software objects and between the Layer 5 application, the Layer 3 application and the software objects; said interfaces including:
   A) a Layer 5 interface for communications between the instances of the software objects and the Layer 5 application;
   B) a channel-call management interface for communications between the channel object and the call management object;
   C) a conference manager interface for communications between instances of the conference manager object and instances of other software objects;
   D) a distributed router interface for communications between the distributed router object and instances of other software objects;
   E) a call management-physical connection interface for communications between the call management object and the physical connection object;
   F) a switch manager interface for communications between the switch manager object and instances of other software objects;
   G) a remote Layer 4 interface for communications between instances of the call management object in two channels;
   H) an interworking interface;
   I) a Layer 3 interface for communications between instances of the software objects and the Layer 3 application; and
   J) a resource object interface for communications between the resource object and instances of other software objects.

14. The switching node of claim 13 wherein a static instance of the channel object, the call management object and the physical connection object is created for every channel in the switching node.

15. The switching node of claim 14 wherein a dynamic instance of the interworking object is created when needed for every channel in the switching node.

16. The switching node of claim 15 wherein the each instance of the channel object manages A. an Layer 3 application interface for exchanging messages between the switching node and the line card;

B. an Layer 5 application interface for exchanging messages between the switching node and the host computer;

C. resource requests for calls processed in the switching node; and

D. processing requests and messages to the call management object.

17. The switching node of claim 16 wherein each switching node maintains tables for processing messages to the channel object and the call management object, the channel object and the call management object processes each incoming message by looking up the message in the table or by creating a default event handler for processing messages not included in the table.

18. The switching node of claim 17 wherein each instance of the call management object A. manages the propagation of messages to and from local channels on the same switching node and remote channels on other switching node;

B. filters messages from local and remote channels; and

C. sends a message to an instance of the physical connection object when the channel is ready for a connection to another channel.

19. The switching node of claim 18 wherein each instance of the physical connection management object manages connection information for the channel when it is ready for connection to a local or remote channel.

20. The switching node of claim 1 wherein each instance of the interworking object translates messages from remote channels for an instance of the call management object in the same channel, the interworking object instance also enabling the system operator to specify a call model for each call on a channel by channel basis.

* * * * *